(12) United States Patent
Huang et al.

(10) Patent No.: US 12,414,166 B2
(45) Date of Patent: Sep. 9, 2025

(54) SYSTEMS AND METHODS FOR REAL-TIME FREQUENCY BAND MONITORING IN A WIRELESS NETWORK

(71) Applicant: Verizon Patent and Licensing Inc., Basking Ridge, NJ (US)

(72) Inventors: Ye Huang, San Ramon, CA (US); Jin Yang, Orinda, CA (US); Suzann Hua, Beverly Hills, CA (US); Ratul K. Guha, Warwick, PA (US); Miguel A. Carames, Long Valley, NJ (US); Alexander Fadeev, Summit, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 362 days.

(21) Appl. No.: 17/935,178

(22) Filed: Sep. 26, 2022

(65) Prior Publication Data
US 2024/0107595 A1    Mar. 28, 2024

(51) Int. Cl.
*H04W 76/10* (2018.01)
*H04W 40/04* (2009.01)

(52) U.S. Cl.
CPC .......... *H04W 76/10* (2018.02); *H04W 40/04* (2013.01)

(58) Field of Classification Search
CPC .......................... H04W 76/10; H04W 72/0457
See application file for complete search history.

(56) References Cited

U.S. PATENT DOCUMENTS

| | | | | |
|---|---|---|---|---|
| 11,785,588 B1 * | 10/2023 | Zhao | ..................... | H04W 72/53 |
| | | | | 370/329 |
| 2021/0258868 A1 * | 8/2021 | Wong | .................... | H04W 4/029 |
| 2023/0052699 A1 * | 2/2023 | Ninglekhu | ............ | H04W 60/04 |
| 2023/0094999 A1 * | 3/2023 | Prakasam | ............. | H04W 48/18 |
| | | | | 455/435.1 |
| 2023/0116879 A1 * | 4/2023 | Tran Le | ................ | H04W 76/16 |
| | | | | 370/235 |

FOREIGN PATENT DOCUMENTS

| | | | | |
|---|---|---|---|---|
| WO | WO-2021138526 A1 * | 7/2021 | ............ | H04W 48/16 |
| WO | WO-2022080244 A1 * | 4/2022 | ............ | H04W 48/18 |

OTHER PUBLICATIONS

3rd Generation Partnership Project, "Technical Specification Group Radio Access Network; Evolved Universal Terrestrial Radio Access Network (E-UTRAN); S1 Application Protocol (S1AP) (Release 17)," 3GPP TS 36.413 V17.1.0 (Jun. 2022), available at https://www.3gpp.org/ftp/Specs/archive/36_series/36.413/36413-h10.zip.

* cited by examiner

*Primary Examiner* — Douglas B Blair

(57) ABSTRACT

A User Equipment ("UE") described herein may connect or request connection to a base station of a wireless network. The base station may implement multiple frequency bands, and connecting or requesting connection to the base station may include connecting or requesting connection via a particular frequency band of the multiple frequency bands. The UE may provide an indication of the particular frequency band to a core of the wireless network. The core may select a set of parameters for communications between the UE and the wireless network based on the indication of the particular frequency band. Additionally, or alternatively, the core may provide an indication of the particular frequency band to a device that provides a service to the UE via the wireless network, and the device may select parameters for the service based on the indication of the particular frequency band.

20 Claims, 11 Drawing Sheets

SYSTEMS AND METHODS FOR REAL-TIME FREQUENCY BAND MONITORING IN A WIRELESS NETWORK

BACKGROUND

Radio access networks ("RANs") may serve as a wireless interface between User Equipment ("UEs"), such as mobile telephones, Internet of Things ("IoT") devices, etc. and a core network and/or other types of networks. RANs and UEs may operate according to different radio access technologies ("RATs"), such as a Long-Term Evolution ("LTE") RAT, a Fifth Generation ("5G") RAT, and/or other RATs. The various RATs may be associated with different frequency bands or sub-bands, such as a Sub-3 Gigahertz or "Sub-3" band, a C-Band (e.g., sometimes referred to as a "Sub-6" band), a millimeter-wave ("mmWave") band, an Advanced Wireless Services ("AWS") band, and/or other bands. Different frequency bands may deliver different speeds, provide for different connectivity range, and/or may have other differentiating attributes.

DETAILED DESCRIPTION OF EXAMPLE EMBODIMENTS

The following detailed description refers to the accompanying drawings. The same reference numbers in different drawings may identify the same or similar elements.

Figure 1:
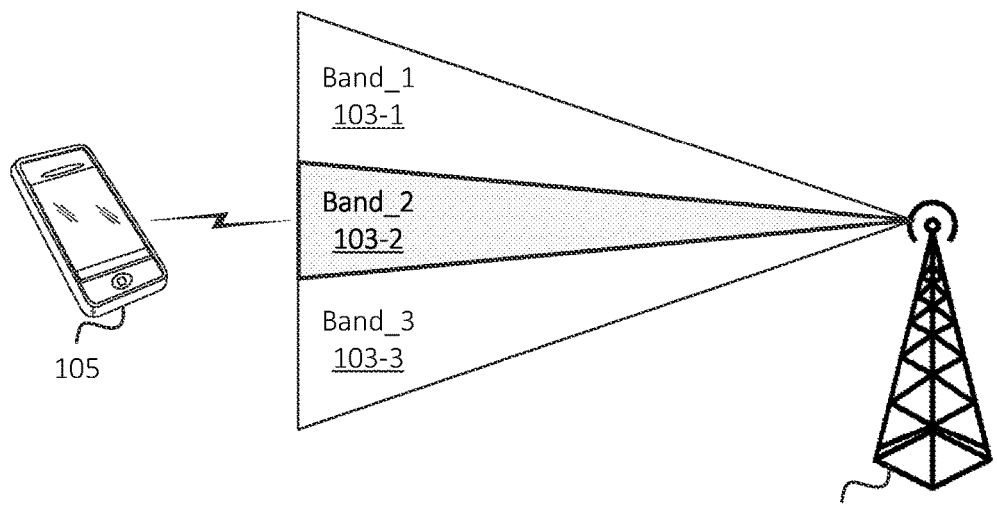
FIG. 1 illustrates an example of a base station that implements multiple frequency bands.

As shown in FIG. 1, wireless network infrastructure of a RAN, such as a particular base station 101 (e.g., which may be, which may include, and/or may be communicatively coupled to an evolved Node B ("eNB"), a Next Generation Node B ("gNB"), a radio unit ("RU"), a remote RU ("RRU"), an Access Point ("AP"), etc.), may operate according to multiple different frequency bands 103 (referred to herein as "bands" 103 for the sake of brevity). In this example, assume that base station 101 operates according to bands 103-1, 103-2, and 103-3 (also referred to as "Band_1," "Band_2," and "Band_3"). For example, different bands 103 may each refer to a different RAT, band, sub-band, carrier, sub-carrier, and/or other portion of RF spectrum. Base station 101 may include, for example, hardware such as antennas, radios, etc. that are capable of operating according to bands 103-1 through 103-3. In some embodiments, for example, bands 103-1 through 103-3 may include one or more LTE bands, 5G bands, or bands associated with other RATs.

One or more UEs 105 (e.g., mobile telephones, IoT devices, wearable devices, autonomous or semi-autonomous wireless manufacturing robots, etc.) may connect to base station 101 via one or more of such bands 103. For example, as shown, a particular UE 105 may communicate with base station 101 via band 103-2. In some embodiments, different UEs 105 may be capable of communicating with base station 101 via some or all of bands 103-1 through 103-3, and/or may be capable of wireless communications according to one or more other bands. In some embodiments, UE 105 may connect to base station 101 via a particular band 103 based on one or more different factors, such as signal quality or other RF metrics associated with bands 103 implemented by base station 101, capabilities of UE 105 (e.g., where UE 105 may not necessarily support all bands 103 implemented by base station 101), and/or other suitable factors. In some situations, UE 105 may switch bands after connecting to base station 101, such as a switch from band 103-2 to band 103-1 or band 103-3.

UE 105 and/or base station 101 may maintain information indicating via which band or bands 103 UE 105 is connected to base station 101. However, other devices, systems, networks, etc. may not be "aware" of the particular band 103 via which UE 105 is connected to base station 101. For example, an application server or Multi-Access/Mobile Edge Computing ("MEC") device, referred to sometimes herein simply as a "MEC," that is providing a service to UE 105 may not have information indicating the particular band or bands 103 via which UE 105 is connected to base station 101. In situations where different bands 103 provide different levels of performance (e.g., throughput, latency, etc.), the delivery of the service via different bands 103 may affect the overall performance, Quality of Service ("QoS") metrics, and/or overall user experience. For example, if the service is relatively latency-sensitive and band 103-2 is congested or is otherwise unable to accommodate the latency needs of the service, the user experience associated with the service may be degraded, as excess latency may be introduced via band 103-2. In accordance with some embodiments, the currently connected band may be provided by the UE to one or more other devices or systems, such that service parameters, network configuration parameters, and/or other parameters may be updated based on which band or bands 103 are being used by UE 105 to communicate with base station 101. For example, the service in the example above may be provided at a lower data rate, and/or other parameters of the service may be modified to account for the added latency via band 103-2. As discussed below, other elements of a network may perform other operations based on monitoring or receiving information indicating which band or bands 103 are used by UE 105 to communicate with base station 101.

Figure 2:
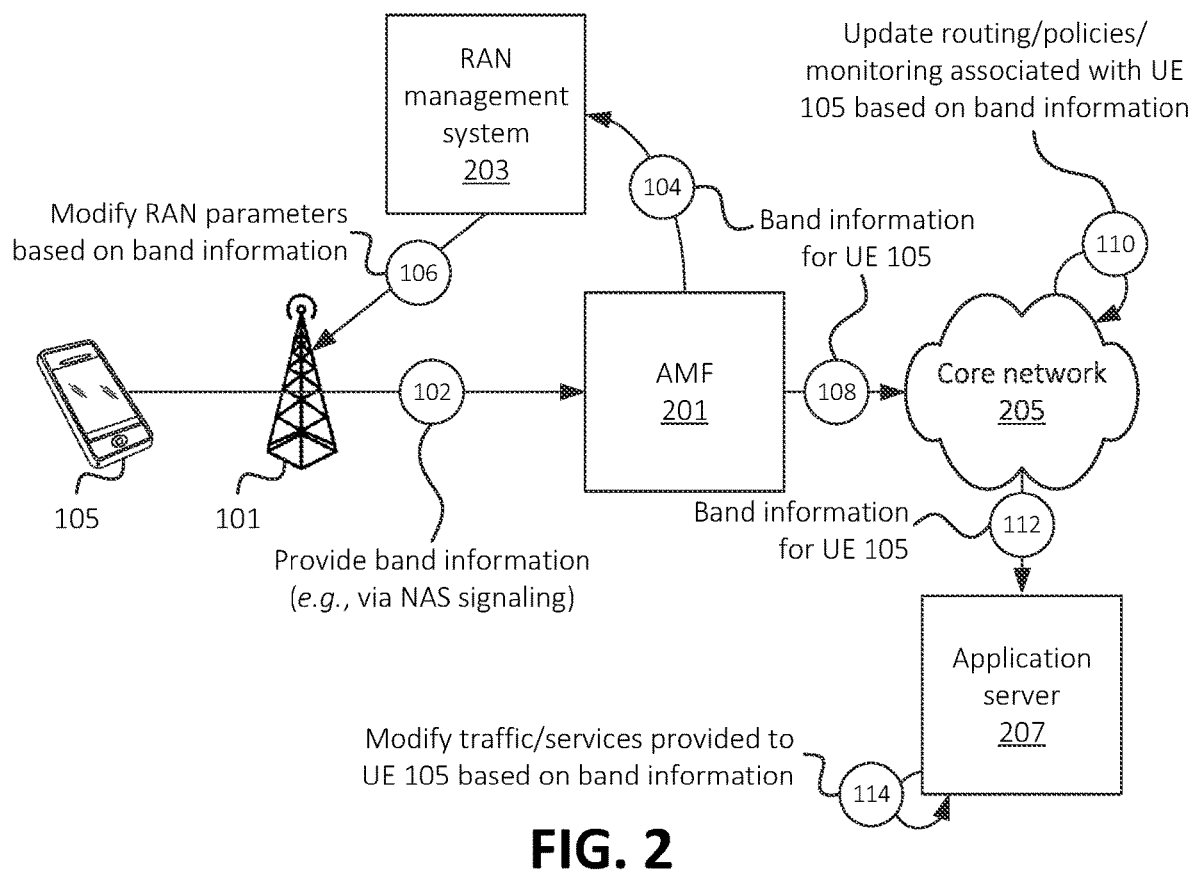
FIG. 2 illustrates an example overview of one or more embodiments described herein.

For example, in accordance with some embodiments and as shown in FIG. 2, UE 105 may provide (at 102) band information to a network access control system, such as Access and Mobility Management Function ("AMF") 201. While examples herein are described in the context of communications between UE 105 and AMF 201, similar concepts may apply to communications between UE 105 and a Mobility Management Entity ("MME") or other suitable element of a network, with which UE 105 is able to communicate. "Band information," as referred to herein, may indicate which RAT, band, sub-band, carrier, sub-carrier, frequency, frequency range, etc. is associated with communications between UE 105 and base station 101 (e.g., via which band or bands UE 105 is currently connected to base station 101).

In some situations, UE 105 may be concurrently connected to base station 101 via multiple bands. In some such situations, one band may be an "active" band and one or more bands may be "idle" or "standby" bands. In some such situations, multiple bands may be "active" bands via which UE 105 actively sends and/or receives wireless traffic to and/or from base station 101. The band information may, in some embodiments, indicate which band or bands 103 are "active" bands and which band or bands are "idle" or "standby" bands. An "active" band may include, for example, a band via which UE 105 actively sends and/or receives wireless traffic to and/or from base station 101. For example, base station 101 may allocate RF resources for communications between UE 105 and base station 101 for an active band. An "idle" or "standby" band may include a band for which UE 105 and base station 101 maintain context information or other suitable connection information, but via which UE 105 and base station 101 do not actively send or receive user plane traffic. For example, base station 101 may not allocate RF resources for communications between UE 105 and base station 101 for an idly or standby band.

In some embodiments, UE 105 may provide the band information via Non-Access Stratum ("NAS") signaling (e.g., via an N1 interface between UE 105 and AMF 201). In some embodiments, UE 105 may provide the band information as part of an initial connection or attachment procedure with base station 101. For example, AMF 201 may receive the band information via Registration Request message, a UECapabilityInfoIndication message, a measurement report (e.g., which may also include signal or channel quality measurements as measured by UE 105), and/or some other suitable message from UE 105. In some embodiments, UE 105 may provide the band information to AMF 201 after a connection to base station 101 has been established, such as when UE 101 has completed a UE-initiated or network-initiated switch from one band 103 to another. UE 105 may provide such band information to AMF 201 via a Radio Resource Control ("RRC") Reconfiguration Complete message or other suitable message. In some embodiments, UE 105 may report band information to AMF 201 via some other suitable communication pathway, such as via one or more application programming interfaces ("APIs"). In some embodiments, UE 105 may execute an application, firmware, etc. that automatically reports the band information to AMF 201. For example, UE 105 may report the band information to AMF 201 on a periodic basis (e.g., every minute, every hour, etc.), on an event-driven basis (e.g., based on connecting to base station 101, based on switching bands 103 while connected to base station 101, and/or based detecting the occurrence of on some other event), based on a request from AMF 201 or some other device or system, based on an input received at UE 105 (e.g., from a user of UE 105 or an application executing at UE 105), and/or on some other suitable basis. In some embodiments, different UEs 105, or types of UEs 105, may report band information to AMF 201 in different manners. For example, a first type of UE 105 (e.g., IoT devices) may report band information on a relatively less frequent periodic basis than another type of UE 105 (e.g., mobile telephones). As another example, a first group of UEs 105 (e.g., a group of UEs 105 associated with a particular organization or category) may report band information on an event-driven basis (e.g., based on connecting to base station 101 or other events), while a second group of UEs 105 (e.g., UEs associated with a different organization or category) may report band information on a periodic basis.

AMF 201 may provide the band information for UE 105 to one or more other devices or systems, such as RAN management system 203, core network 205, and/or application server 207. For example, AMF 201 may provide (at 104) band information for UE 105 to RAN management system 203. RAN management system 203 may, for example, configure one or more parameters of base station 101, such as queue weight parameters, beamforming parameters (e.g., azimuth angle, beam width, beam transmit power, etc. associated with one or more antennas or radios that implement bands 103), RF allocation parameters, or other suitable RAN parameters. RAN management system 203 may modify (at 106) one or more parameters of base station 101 and/or other base stations 101 based on receiving band information for UE 105 and/or one or more other UEs. For example, RAN management system 203 may determine that a particular band 103 is congested at a given location, and may "steer" one or more antennas associated with the particular band 103 away from the given location, in order to reduce congestion of the particular band 103 at base station 101.

AMF 105 may additionally, or alternatively, provide (at 108) band information, for UE 105 and/or one or more other UEs, to one or more elements of core network 205. Core network 205 may select or update (at 110) routing information, policies, monitoring information, and/or other parameters based on the band information. For example, core network 205 may select or assign a particular network slice, a set of QoS parameters (e.g., traffic templates, QoS Class Identifier ("QCI") values, 5G QoS Identifier ("5QI") values, etc.), and/or other suitable parameters to communications associated with UE 105 based on which particular band 103 is being used by UE 105 to communicate with base station 101. For example, different network slices may be associated with different measures of QoS or other metrics, and core network 205 may select a particular network slice that, in combination with the currently connected band 103 associated with UE 105, delivers at least a threshold measure of performance. As another example, core network 205 may maintain up-to-date usage information, which may be used by a policy and/or charging system of core network 205 to compare usage via the particular band 103 and a maximum allotment of usage via the particular band 103 associated with UE 105.

In some embodiments, one or more devices or systems external to core network 205 or a RAN that includes base station 101 may receive band information associated with UE 105. For example, application server 207, which may provide services to UE 105 (e.g., via core network 205 and/or one or more other networks), may receive (at 112) an indication of the currently connected band 103 associated with UE 105. Application server 207 may modify (at 114)

traffic and/or services provided to UE 105 based on the band information. For example, if UE 105 is connected to base station 101 via a relatively low throughput band, application server 207 may reduce a bitrate of traffic sent to UE 105. If, on the other hand, UE 105 is connected to base station 101 via a relatively high throughput band, application server 207 may increase a bitrate of traffic sent to UE 105. In practice, other operations may be performed by RAN management system 203, core network 205, application server 207, and/or other suitable devices or systems based on receiving information indicating the particular band or bands 103 that is/are being used by UE 105 to communicate with base station 101. Accordingly, the manner in which application server 207 provides services to UE 105 via base station 101 and/or core network 205 may take the currently connected band 103 into account, which may provide for an enhanced user experience as well as more efficient use of resources.

Figure 3:
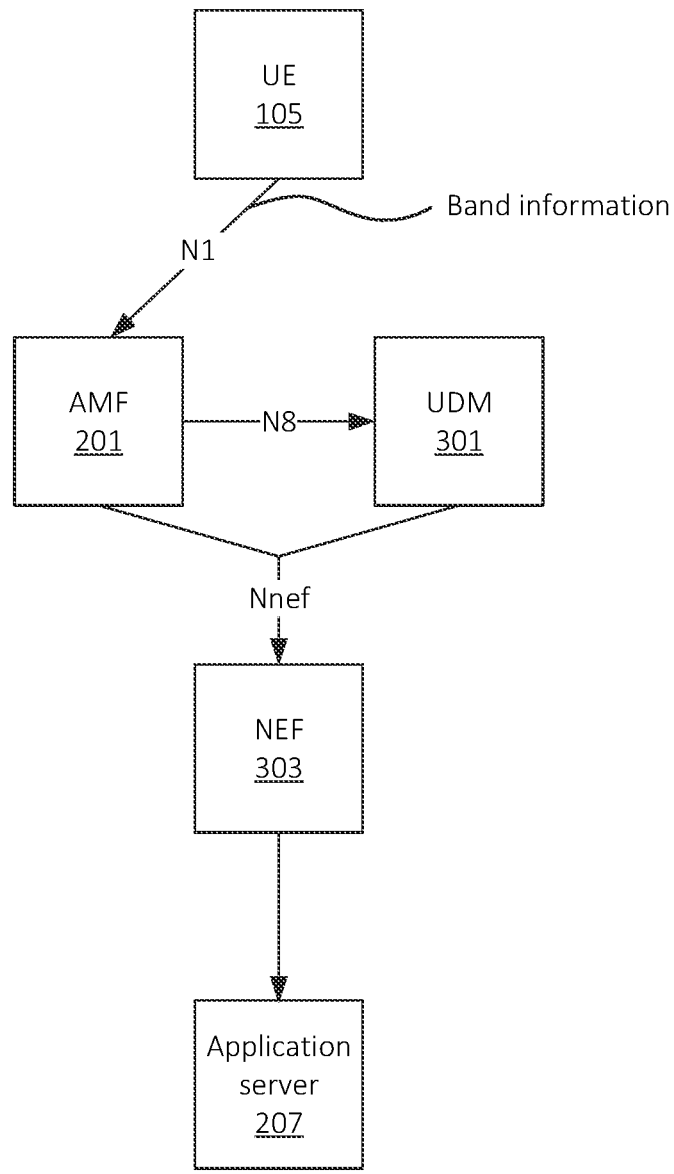
FIG. 3 illustrates example communication interfaces via which a core network and/or other devices or systems may receive band information associated with a UE, in accordance with some embodiments.

FIG. 3 illustrates example interfaces between UE 105 and one or more other devices or systems, via which UE 105 may provide band information to such devices or systems. For example, as shown, UE 105 may provide band information to AMF 201 via an N1 interface, via NAS messaging, via control plane signaling, etc. In some embodiments, UE 105 may provide the band information to AMF 201 via base station 101, such as by sending RRC messages to base station 101, which may encapsulate, wrap, etc. such messages in a format, protocol, etc. associated with the N1 interface and/or otherwise associated with communications between base station 101 and AMF 201 (e.g., via one or more Next-Generation Application Protocol ("NGAP") messages). The band information, as provided by UE 105, may include one or more identifiers of UE 105, such as a Subscription Permanent Identifier ("SUPI"), a Globally Unique Temporary Identifier ("GUTI"), an International Mobile Station Equipment Identity ("IMEI") value, a Mobile Directory Number ("MDN"), and/or other suitable information based on which band information for a particular UE 105 may specifically associated with such particular UE 105.

AMF 201 may provide the band information for one or more UEs 105 to one or more other devices or systems, such as one or more other elements of core network 205. AMF 201 may, for example, automatically provide the band information to the other devices or systems (e.g., periodically or intermittently, each time band information is received from a respective UE 105, etc.), and/or may provide the band information to such devices or systems based on receiving a request from such devices or systems. For example, AMF 201 may provide the band information to a UE information repository of core network 205, such as Unified Data Management function ("UDM") 301 via an N8 interface or some other suitable communication pathway. In some embodiments, one or more other devices or systems that communicate with UDM 301 may request, receive, etc. the band information. For example, a charging or usage monitoring system may maintain information indicating which band or bands 103 have been used by UE 105, and an account, subscription status, usage allotment, etc. associated with UE 105 may be updated accordingly.

In some embodiments, AMF 201 and/or some other device or system of core network 205 (e.g., UDM 301) may provide the band information to a device or system that serves an interface between core network 205 and one or more external devices or systems, such as Network Exposure Function ("NEF") 303 (e.g., via a Nnef interface), a Service Capability Exposure Function ("SCEF"), or other suitable device or system.

NEF 303 may accordingly allow devices external to core network 205, such as application server 207 and/or other devices or systems, to receive band information for respective UEs 105. For example, NEF 303 may maintain information indicating which devices or systems are authorized to receive band information for particular UEs 105. In this example, NEF 303 may maintain information indicating that a particular application server 207 is authorized to receive band information for a particular UE 105, and may accordingly provide such band information to application server 207 (e.g., may automatically "push" the band information to application server 207 or may respond with band information based on requests from application server 207). While some examples of devices or systems that may receive band information are provided above, in practice, other devices or systems (e.g., other elements of core network 205) may receive band information for one or more UEs 105 (e.g., from AMF 201, UDM 301, etc., via interfaces between such elements).

Figure 4A:
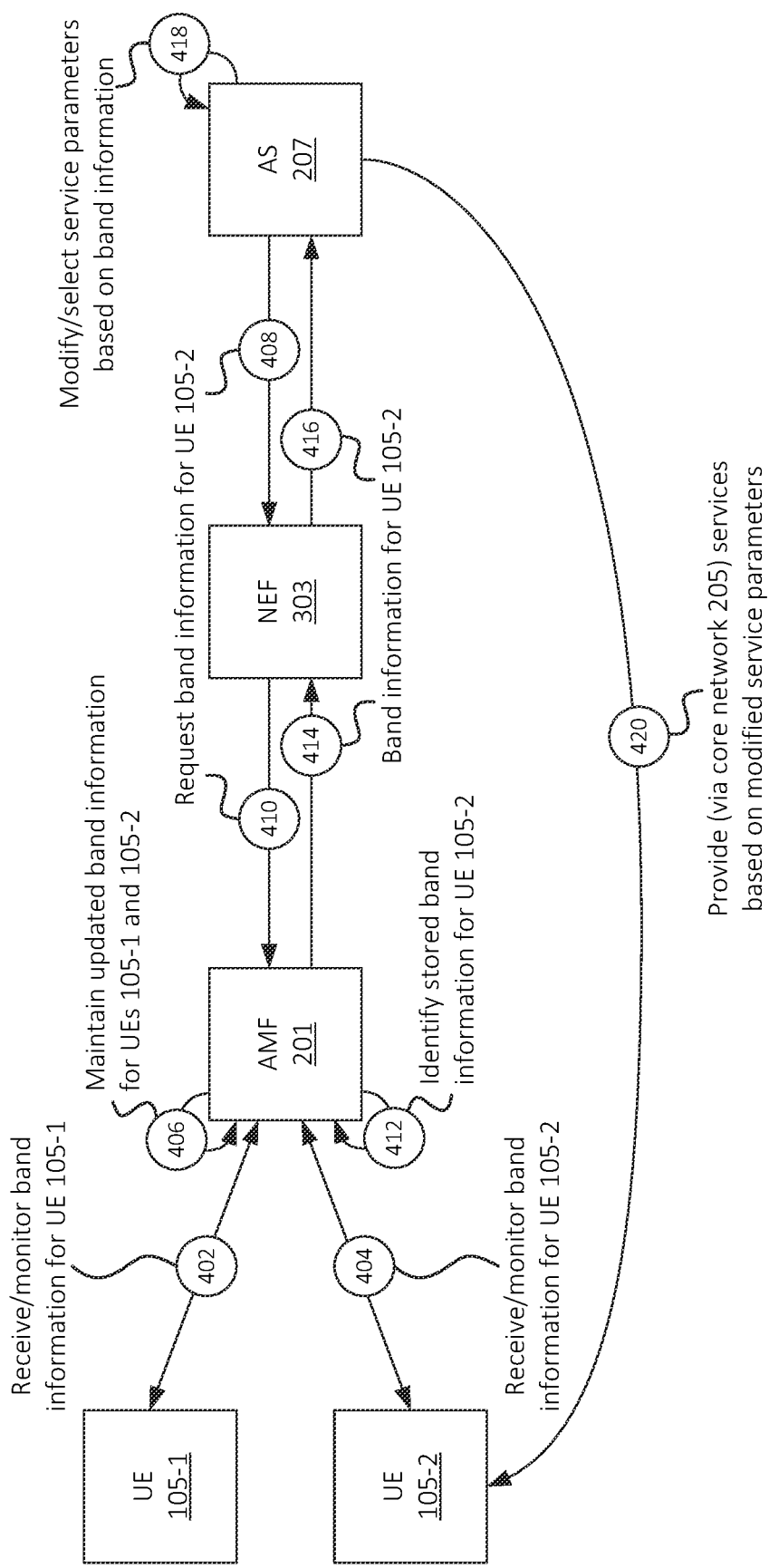
FIGS. 4A and 4B illustrate an example of a device or system modifying service parameters based on band information received from a UE, in accordance with some embodiments.
Figure 4B:
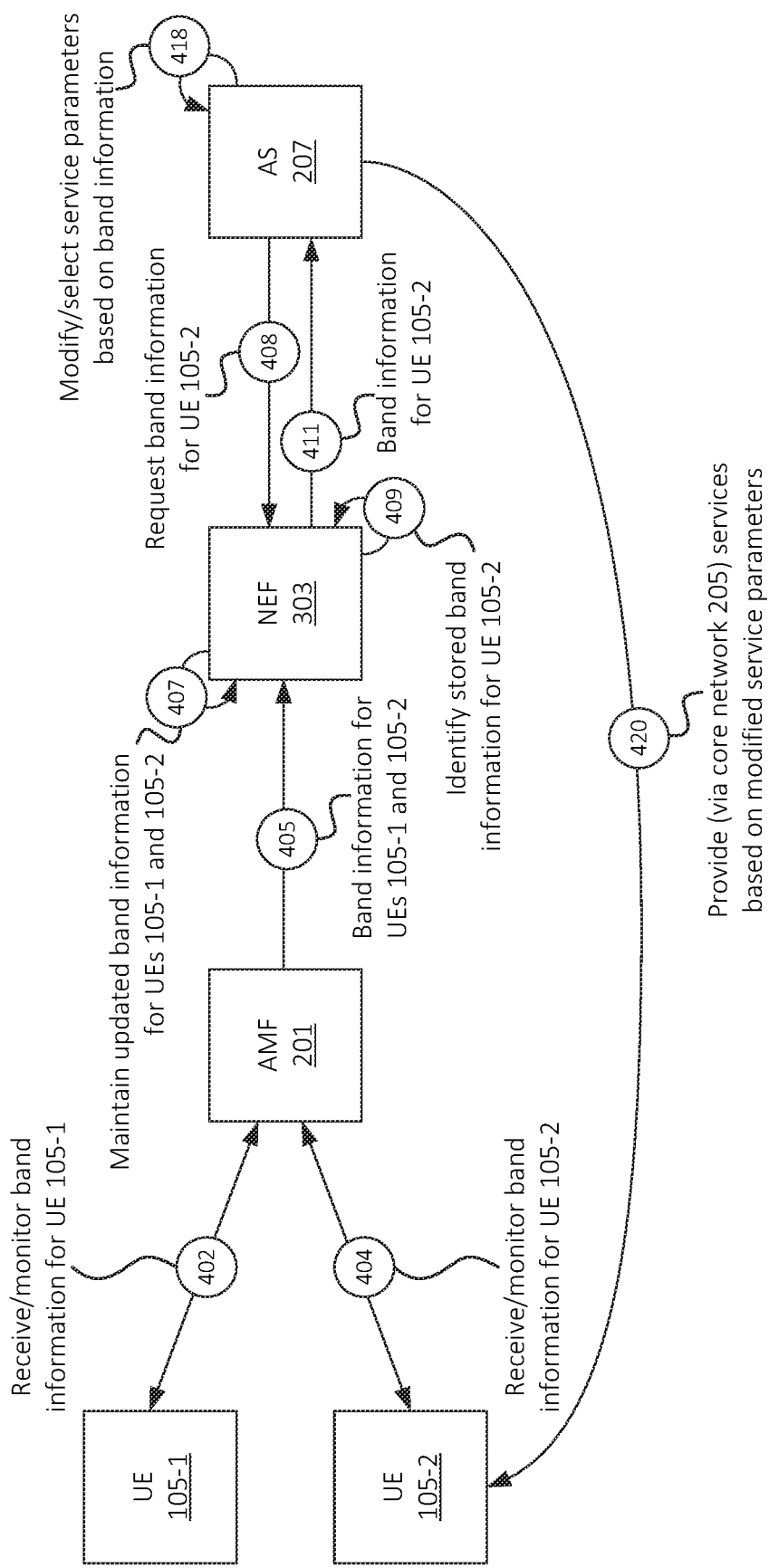
Figure 5:
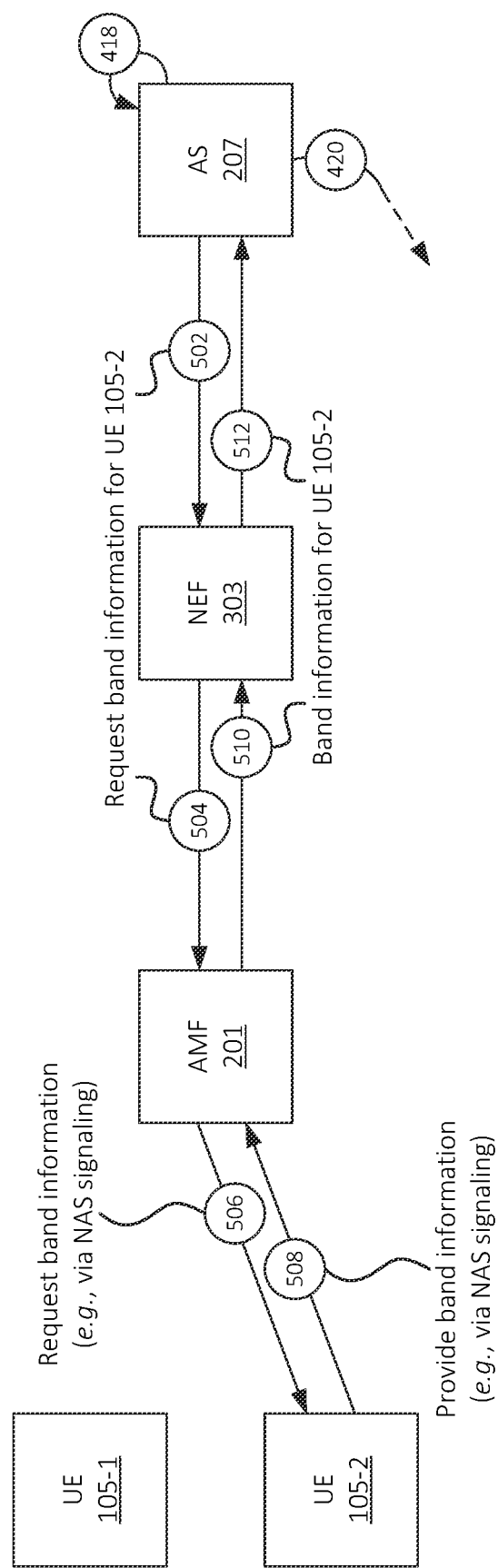
FIG. 5 illustrates an example of requesting band information from a UE, in accordance with some embodiments.

FIGS. 4A, 4B, and 5 illustrate examples in which a device external to core network 205 (i.e., application server 207, in these examples) receives band information for a particular UE 105, and modifies service parameters based on the band information. As shown in FIG. 4A, AMF 201 may receive, monitor, etc. (at 402 and 404) band information associated with multiple UEs 105, including UEs 105-1 and 105-2. For example, as discussed above, UEs 105-1 and 105-2 may each push the band information periodically, on an event-driven basis, etc. to AMF 201 via NAS messaging while connected to a respective base station 101. UEs 105-1 and 105-2 may provide (at 402 and 404) the band information to AMF 201 in an asynchronous and/or independent manner, inasmuch as UE 105-1 provides (at 402) respective band information to AMF 201 independently from UE 105-2 providing (at 404) its own respective band information, and vice versa. In some embodiments, UEs 105-1 and 105-2 may provide (at 402 and 404) band information in a synchronized manner, such as at the same periodicity. In some embodiments, UEs 105 may include band information when outputting connection requests to connect or attach to base station 101. For example, band information may be included in an RRC Setup Request message, a NAS Registration Request, a Packet Data Network ("PDN") Connectivity Request, or other suitable messaging between UE 105 and base station 101 and/or AMF 201. In some embodiments, the band information may be included, or "piggybacked," in one or more existing messages that are sent by UE 105 to base station 101 and/or AMF 201.

Based on receiving (at 402 and 404) the band information, AMF 201 may store, maintain, etc. (at 406) up-to-date band information for UEs 105-1 and 105-2. For example, in situations where UE 105-1 and/or UE 105-2 were previously connected to a different band 103, AMF 201 may update, overwrite, etc. previous band information to reflect the band or bands 103 to which UEs 105-1 and 105-2 are currently connected (e.g., as received at 402 and/or 404). Thus, in the example shown in FIG. 4A, AMF 201 may store, maintain, etc. (at 406) up-to-date band information associated with UEs 105. In some embodiments, AMF 201 may output band information to UDM 301 (e.g., via the N8 interface as discussed above or via some other suitable communication pathway), based on which UDM 301 may maintain band information for one or more UEs, such as UEs 105-1 and 105-2.

At some point, application server 207 may request (at 408) band information for UE 105-2. Application server 207 may be associated with UE 105-2, such as by actively providing a service to UE 105-2 (e.g., communicating with UE 105-2 via core network 205 and/or some other network), by preparing to provide a service to UE 105-2 (e.g., based on a predicted or estimated demand for service, based on a scheduled event, etc.), and/or otherwise maintaining some association with UE 105-2. In some embodiments, application server 207 and/or UE 105-2 may have previously registered with NEF 303 and/or some other device or system indicating the association between UE 105-2 and application server 207, and/or by otherwise indicating authorization for application server 207 to request and/or receive band information associated with UE 105-2. In some embodiments, application server 207 may "subscribe" to or otherwise request band information associated with UE 105-2, such as by providing one or more identifiers of UE 105-2 (e.g., an Internet Protocol ("IP") address, an MDN, etc.), based on which NEF 303 is able to identify the authorization of application server 207 to receive band information associated with UE 105-2. The request (at 408) may accordingly include an identifier of UE 105-2, an identifier and/or authentication information associated with application server 207, and/or other suitable information based on which NEF 303 is able to determine that application server 207 is authorized to receive band information for UE 105-2.

Assuming NEF 303 has authenticated the request (at 408) and/or has verified authorization for application server 207 to receive band information for UE 105-2, NEF 303 may forward (at 410) the request for band information, associated with UE 105-2, to AMF 201. AMF 201 may identify (at 412) previously stored band information for UE 105-2, and may respond (at 414) with an indication of the currently connected band or bands 103 associated with UE 105-2. As discussed above, AMF 201 may indicate which band or bands 103 is/are active bands and/or which band or bands 103 is/are idle or standby bands.

Additionally, or alternatively, NEF 303 may request band information from one or more other sources, such as UDM 301. As discussed above, UDM 301 may maintain band information and may accordingly respond to requests from NEF 303 or other authorized entities for such information. In some situations, UDM 301 may not maintain band information for one or more UEs 105, such as situations in which UDM 301 has not yet received band information (e.g., from AMF 201), or is not configured to receive or maintain band information. In some embodiments, based on determining that UDM 301 does not maintain the requested band information, UDM 301 may respond to NEF 303 with an indication that UDM 301 does not maintain such information. In such scenarios, NEF 303 may then request (at 410) band information from AMF 201 and/or from some other source. Additionally, or alternatively, based on determining that UDM 301 does not maintain the requested band information, UDM 301 may request the band information from AMF 201 and may forward such information to NEF 303.

As another example situation, UDM 301 may maintain band information, along with a timestamp or some other temporal information associated with the band information (e.g., an indication of when the band information was received, generated, etc.). In some scenarios, UDM 301 may receive a request (e.g., from NEF 303) for band information, and may provide the band information along with the associated temporal information. NEF 303 may, in some embodiments, determine whether the band information is "old," stale," etc. For example, if the band information was received, generated, etc. at least a threshold amount of time before NEF 303 outputted the request or received the band information, NEF 303 may determine that the band information is "old," "stale," etc. (referred to herein simply as "stale" for the sake of brevity), and may subsequently request (at 410) the band information from AMF 201. Additionally, or alternatively, UDM 301 may make a determination as to whether band information is stale. In situations where UDM 301 has determined that band information is stale, UDM 301 may request band information from AMF 201, and provide such information to NEF 303. Additionally, or alternatively, in situations where UDM 301 has determined that band information is stale, UDM 301 may indicate that UDM 301 does not have the requested band information, and/or that UDM 301 has stale band information, based on which NEF 303 may request (at 410) the band information from AMF 201 or some other suitable source.

Once NEF 303 has received (at 414) the requested band information, NEF 303 may forward (at 416) the band information for UE 105-2 to application server 207. Application server 207 may, in some situations, modify or select (at 418) particular service parameters associated with one or more services, traffic, etc. provided to UE 105-2 (e.g., via core network 205) based on the received band information. For example, as discussed above, application server 207 may modify a bitrate of traffic sent to UE 105-2 based on the band information, may change protocols or other service attributes based on band information, may select or de-select UE 105-2 as a host for a group messaging or gaming session, and/or may perform other suitable service parameter modifications based on the band information. Generally, as discussed above, application server 207 may make such modifications in order to account for differing performance attributes or other attributes associated with different bands 103. Application server 207 may proceed to provide (at 420) one or more services to UE 105-2 (e.g., via core network 205 and base station 101) according to the modified or selected service parameters.

In some embodiments, AMF 201 may provide (at 414) band information in a request-response fashion. For example, AMF 201 may forgo providing such band information (e.g., to NEF 303 and/or application server 207) in the absence of a request (e.g., at 410), and may provide the band information after receiving such a request. In some embodiments, AMF 201 may provide (at 414) band information on a periodic basis, on an event-driven basis (e.g., each time updated band information is received for UE 105-2), and/or on some other basis. In this sense, application server 207 may "subscribe" to updates for band information associated with UE 105-2, without needing to issue multiple requests for such information.

As shown in FIG. 4B, NEF 303 and/or some other device or system (e.g., other than AMF 201) may maintain band information associated with UEs 105. For example, as shown, AMF 201 may forward (at 405) band information received (at 402 and 404) from UEs 105-1 and 105-2 to NEF 303. For example, AMF 201 may forward (at 405) band information upon receiving (at 402 and 404) such information. NEF 303 may maintain (at 407) such band information at a local storage device, a remote cloud storage system, etc. When receiving (e.g., at 408) a request for band information associated with UE 105-2, NEF 303 may identify (at 409) previously received band information for UE 105-2, and may provide (at 411) the band information for UE 105-2 to application server 207. As similarly discussed above, application server 207 may modify or select (at 418) particular service parameters based on the band information, and provide (at 420) one or more services to UE 105-2 based on the modified or selected service parameters.

As shown in FIG. 5, AMF 201 may request, or "pull," band information from UEs 105 (e.g., in lieu of, or in addition to, band information being "pushed" from UEs 105). In this example, application server 207 may request (at 502) band information associated with UE 105-2. For example, application server 207 may request such information from NEF 303. NEF 303 may determine that NEF 303 does not store band information for UE 105-2. For example, in the example of FIG. 4B, NEF 303 may be configured to store band information. However, situations may arise in which NEF 303 has yet to receive band information associated with UE 105-2, or where band information stored by NEF 303 is "stale" (e.g., has been received at least a threshold time before the request is received). Additionally, or alternatively, in some embodiments, NEF 303 may not be configured to store band information for UE 105-2.

Based on NEF 303 not storing band information for UE 105-2 (e.g., including embodiments in which NEF 303 is not configured to store band information), NEF 303 may forward (at 504) the request to AMF 201. In a similar manner, if AMF 201 does not store the requested band information (e.g., in situations where AMF 201 is configured to maintain band information but has not yet received band information, where AMF 201 stores stale band information for UE 105-2, and/or where AMF 201 is not configured to store band information), AMF 201 may request (at 506) band information from UE 105-2. For example, AMF 201 may output one or more messages via NAS signaling, via an N1 interface, via an API, etc. to UE 105-2. In some embodiments, the message may include a Session Establishment Request, a Session Modification Request, a protocol data unit ("PDU") Session Modification Command, and/or some other suitable message. In some embodiments, AMF 201 may provide the request to base station 101, which may wrap, encapsulate, translate, etc. the request to some other format, such as a RRC Reconfiguration Request that includes a flag, indicator, custom field, etc. that indicates that an appropriate response to the RRC Reconfiguration Request includes band information from UE 105-2. While the message may be of a type that is typically used to modify parameters of a communication session associated with UE 105-2, the message may, in some embodiments, not include any actual modifications to such parameters, and may instead be a technique for providing the band information request to UE 105.

UE 105-2 may respond (at 508) with information indicating the particular band or bands 103 used by UE 105-2 to wirelessly communicate with base station 101. For example, UE 105-2 may provide (at 508) the band information via NAS signaling, an N1 interface, an API, etc. The band information may be provided via an RRC Reconfiguration Complete message, a PDU Session Establishment Accept message, or other suitable message. As similarly noted above, while the message may be of a type that is typically used to indicate the confirmation or acceptance of modified parameters of a communication session associated with UE 105-2, the message may, in some embodiments, not indicate or be based on any actual modifications to such parameters, and may instead be a technique for providing the band information to AMF 201.

In some embodiments, AMF 201 may store and/or maintain (e.g., as discussed above with respect to operation 406) the received (at 508) band information. Additionally, or alternatively, AMF 201 may forward (at 510) the band information to NEF 303. Similarly, NEF 303 may, in some embodiments, store and/or maintain (e.g., as discussed above with respect to operation 409) the received (at 510) band information. NEF 303 may forward (at 512) the requested band information to application server 207. As similarly discussed above, application server 207 may select or modify (at 418) service parameters, and provide (at 420) one or more services to UE 105-2 based on the selected or modified service parameters.

Figure 6:
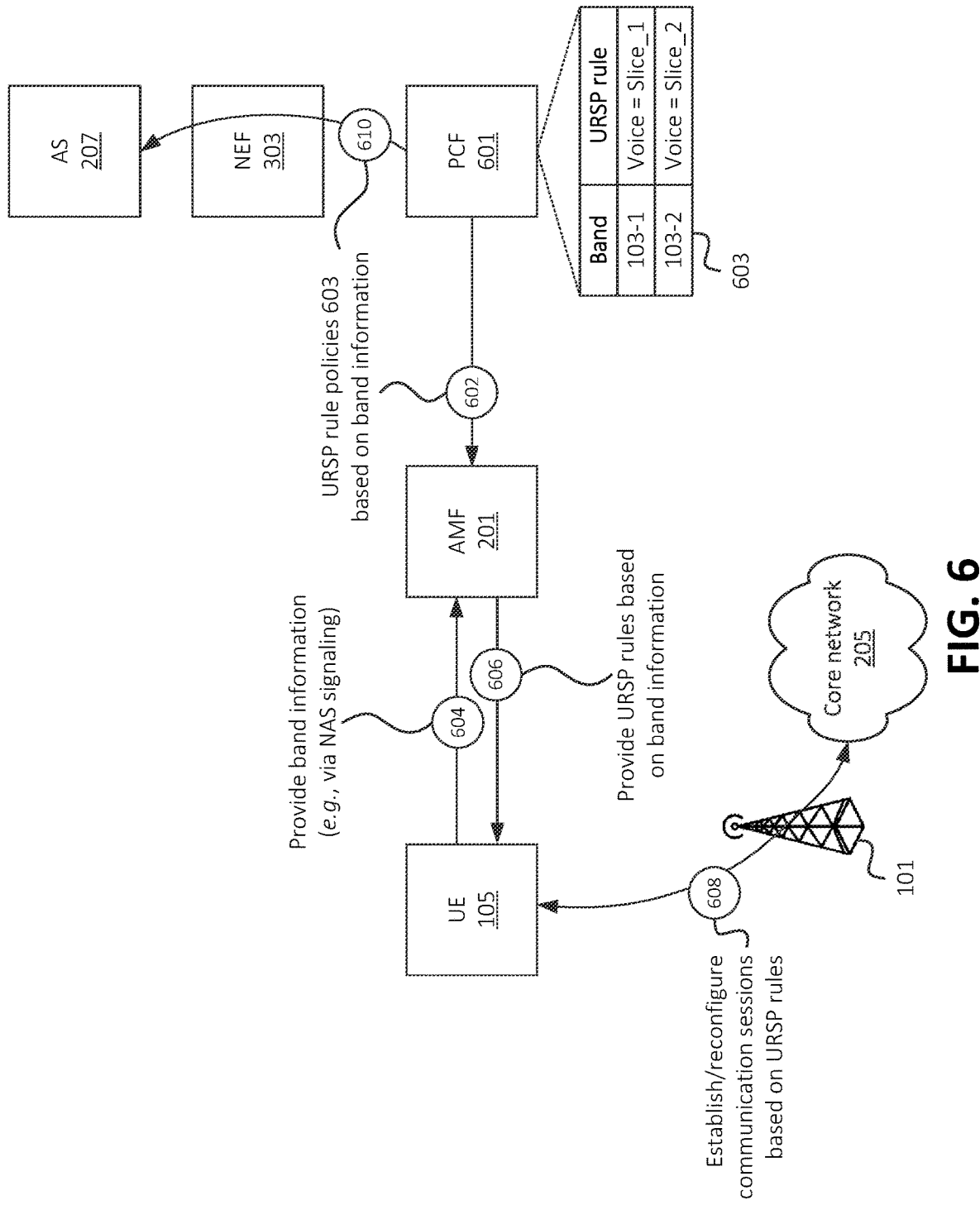
FIG. 6 illustrates an example of selecting or modifying parameters of communications between a UE and a RAN and/or core network based on band information received from a UE, in accordance with some embodiments.

In some embodiments, as discussed above, core network 205 and/or a RAN (e.g., including base station 101) may select or modify parameters based on the currently connected band associated with a given UE 105. For example, as shown in FIG. 6, AMF 201 may receive (at 602), from Policy Control Function ("PCF") 601 and/or some other suitable rule and/or policy system, a set of policies 603 relating to UE Route Selection Policy ("URSP") rules or other suitable types of information. URSP rules may, for example, specify QoS rules, routing rules, and/or other information indicating a manner in which UE 105 should prioritize, queue, output, and/or perform other operations with respect to network traffic. For example, a particular URSP rule may specify that traffic having particular attributes or characteristics (also referred to as "traffic descriptors") should be associated with a particular network slice. The URSP rule policy or policies 603, provided (at 602) by PCF 601 to AMF 201, may include multiple different sets of URSP rules based on different bands 103.

For example, if UE 105 is connected to base station 101 via a first band 103-1, then the URSP rule policy may specify a first set of URSP rules to be used by UE 105, and if UE 105 is connected to base station 101 via a second band 103-2, then the URSP rule policy may specify a second set of URSP rules to be used by UE 105. For example, if UE 105 is connected to a first band 103-1 that is associated with relatively higher latency, then the URSP rules may specify that traffic matching a particular set of traffic descriptors should be associated with a highly prioritized network slice, which may offset or compensate for the relatively higher latency associated with band 103-1. If, on the other hand, UE 105 is connected to a second band 103-2 that is associated with relatively lower latency, then the URSP rules may specify that traffic matching the same set of traffic descriptors should be associated with a less highly prioritized network slice, which may ultimately still yield at least a threshold measure of performance without consuming resources of the more highly prioritized network slice.

FIG. 6 illustrates a simplified set of URSP rule policies 603 for the sake of explanation. For example, as shown, URSP rule policies 603 may indicate that when UE 105 is connected via band 103-1, voice traffic should be associated with a first network slice ("Slice 1"). Further, URSP rule policies 603 may indicate that when UE 105 is connected via band 103-2, voice traffic should be associated with a second network slice ("Slice 2").

In some embodiments, PCF 601 may "push" the URSP rule policies to AMF 201, such that AMF 201 stores and/or maintains URSP rule policies for one or more UEs 105. Additionally, or alternatively, AMF 201 may request the URSP rule policies from PCF 601 during a registration or connectivity establishment procedure with UE 105, a PDU session establishment procedure, or other suitable procedure during which AMF 201 communicates with UE 105.

As further shown, UE 105 may provide (at 604) band information to AMF 201 (e.g., via NAS signaling, via an N1 interface, etc.), indicating a particular band or bands 103 via which UE 105 is connected to base station 101. As discussed above, UE 105 may provide such information periodically, as part of a connection or communication session establishment request, etc. AMF 201 may identify a particular set of URSP rules that are associated with the indicated band or bands 103 (e.g., as indicated by URSP rule policies 603), and may provide (at 606) the relevant URSP rules (e.g., associated with the indicated band or bands 103) to UE 105. Additionally, or alternatively, AMF 201 may forward some or all of the URSP rule policies 603 to UE 105, without first receiving (at 604) band information from UE 105.

As further shown, UE 105, base station 101, and/or core network 205 may communicate (at 608) in accordance with the URSP rules that were identified based on the currently connected band or bands 103 associated with UE 105. For example, UE 105 may request a particular network slice for a particular communication session (e.g., matching traffic descriptors associated with one or more relevant URSP rules), which may include requesting such network slice for a new communication session or for the modification of an existing communication session.

In some embodiments, application server 207 (e.g., which is in communication with UE 105) may also have access to some or all of the URSP rule policies 603 provided to UE 105. For example, application server 207 may receive (at 610) URSP rule policies 603 from PCF 601 (e.g., via NEF 303). As discussed above, NEF 303 may, for example, authenticate and/or determine that application server 207 is authorized to receive such information, which may be based on a registration procedure associated with UE 105 and/or application server 207, and/or based on some other suitable procedure. In some embodiments, application server 207 may request URSP rule policies 603 from NEF 303, and/or NEF 303 may "push" URSP rule policies 603 to application server 207 (e.g., based on an association between application server 207 and UE 105). In this manner, application server 207 may have access to both band information associated with UE 105 (e.g., as received at 112, 411, 416, 502, etc.), as well as URSP rule policies 603 indicating particular URSP rules associated with particular bands. In this manner, application server 207 may be able to modify, configure, etc. services provided to UE 105 (e.g., modify a bitrate, modify a polling rate, modify QoS parameters, etc.) in order to conform with or otherwise account for URSP rules that are associated with the currently connected band for UE 105.

Figure 7:
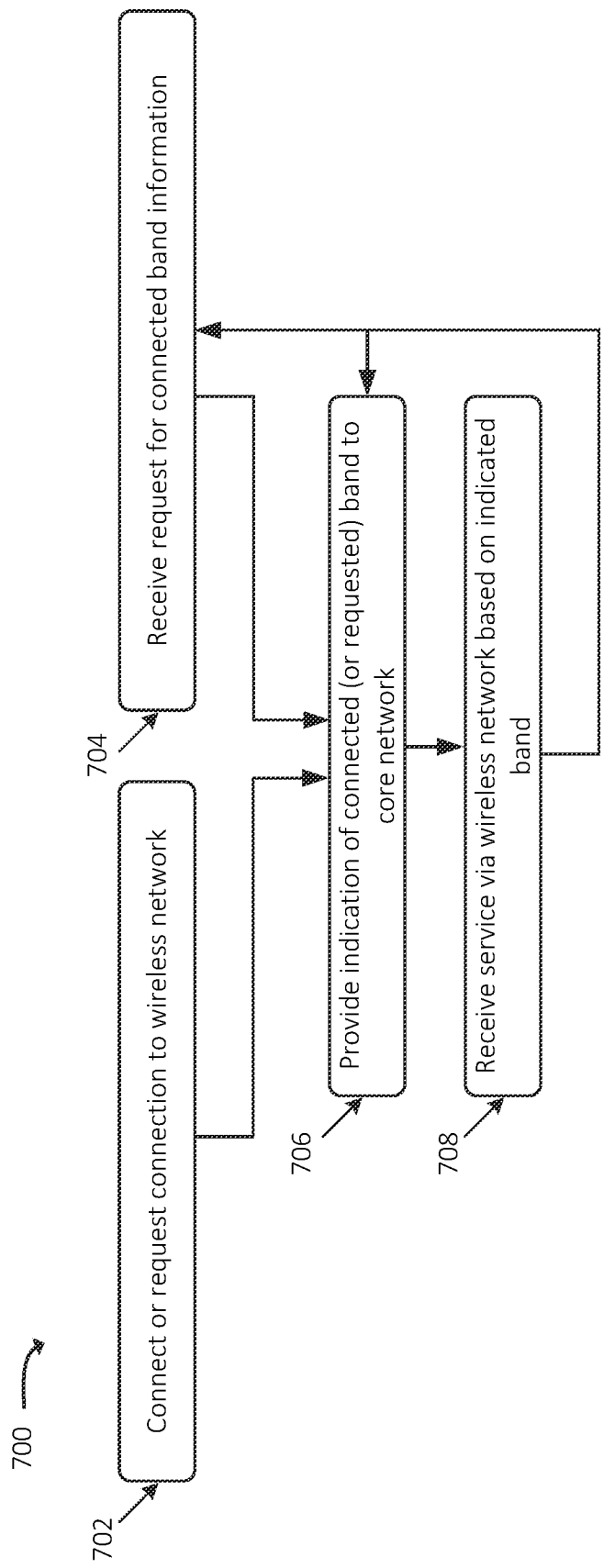
FIG. 7 illustrates an example process for providing or exposing band information from a UE 105 to a core network and/or other devices or systems, in accordance with some embodiments.

FIG. 7 illustrates an example process 700 for providing, exposing, etc. band information from UE 105 to core network 205 and/or other devices or systems. In some embodiments, some or all of process 700 may be performed by UE 105. In some embodiments, one or more other devices may perform some or all of process 700 in concert with, and/or in lieu of, UE 105.

As shown, process 700 may include connecting or requesting (at 702) connection to a wireless network. For example, UE 105 may connect to base station 101 via a particular band out of a set of different bands implemented by base station 101. Additionally, or alternatively, UE 105 may output a request to connect to base station 101, such as via an RRC Connection Request message.

Process 700 may further include providing (at 706) an indication of the currently connected and/or requested band to core network 205. For example, as discussed above, UE 105 may communicate with AMF 201 (e.g., via NAS signaling, via an N1 interface, etc.), and may indicate a particular band 103 to which UE 105 is connected. For example, UE 105 may provide such information periodically or intermittently, based on establishing or re-establishing a connection to base station 101, and/or on some other basis. In some embodiments, UE 105 may provide the information as part of a request to connect to base station 101 and/or establish one or more communication sessions with core network 205. In some embodiments, as discussed above, UE 105 may provide (at 706) the indication based on receiving (at 704) a request for the band information. For example, as discussed above, UE 105 may receive (at 704) the request from AMF 201, via a user input at UE 105, via a request from an application executing at UE 105, and/or from some other suitable source.

Process 700 may additionally include receiving (at 706) service via the wireless network (e.g., via base station 101 and core network 205) based on the indicated band. For example, as discussed above, one or more elements of core network 205 (e.g., AMF 201) may select and provide a set of URSP rules to UE 105, based on which UE 105 may request or establish communication sessions (e.g., PDU sessions) according to particular network slices or other parameters. Additionally, or alternatively, application server 207, which communicates with UE 105 via the wireless network, may select or adjust one or more service parameters based on the indicated band. As another example, base station 101 and/or one or more other RAN elements may select or adjust parameters based on band information received from UE 105 and/or other UEs (e.g., to reduce or adjust load associated with one or more bands). As shown, some or all of process 700 may be performed and/or repeated iteratively, such that services received by UE 105 may be adjusted in real time or near-real time, such as in situations where UE 105 switches from one band 103 to another.

Figure 8:
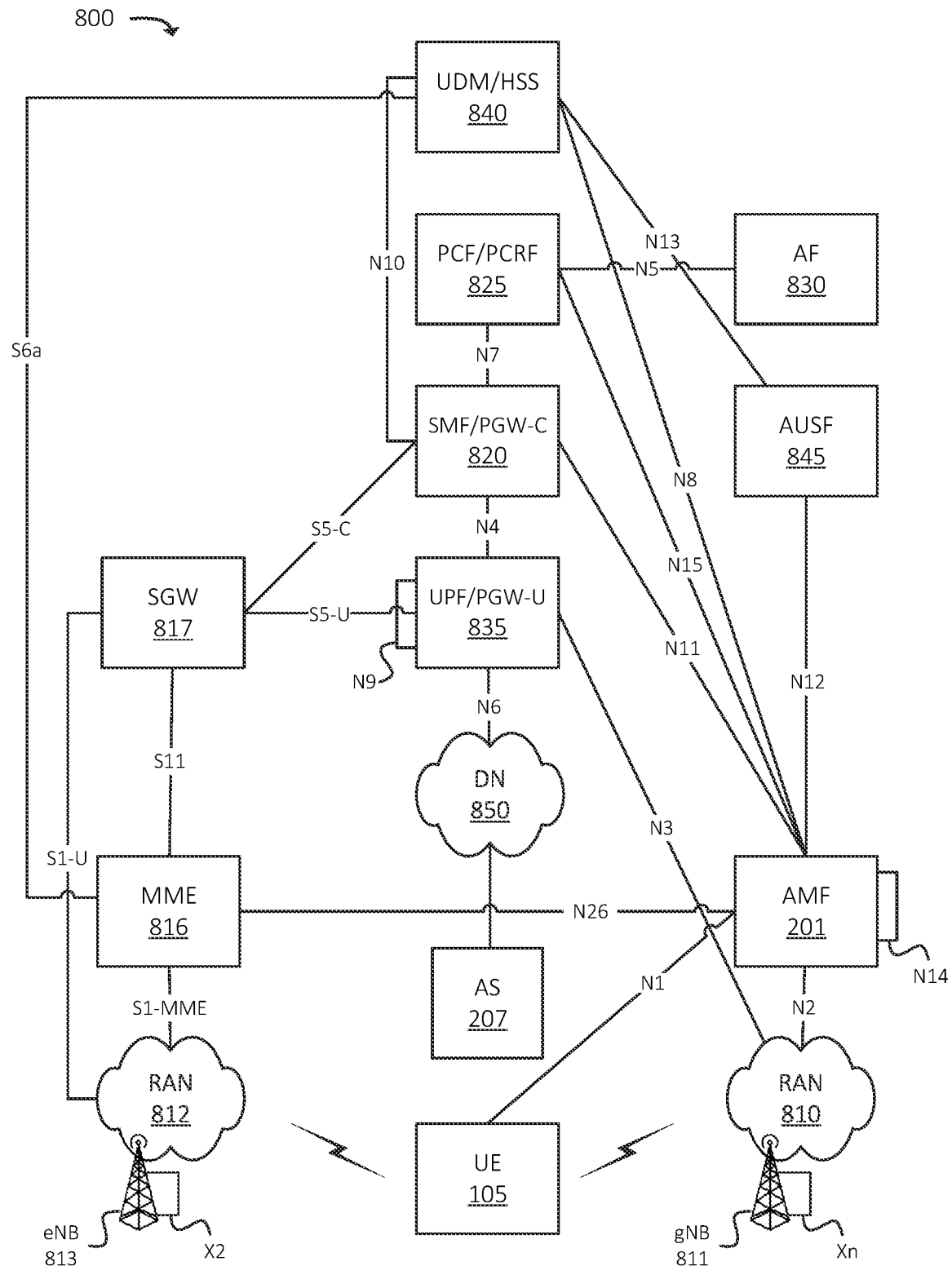
FIG. 8 illustrates an example environment in which one or more embodiments, described herein, may be implemented.

FIG. 8 illustrates an example environment 800, in which one or more embodiments may be implemented. In some embodiments, environment 800 may correspond to a 5G network, and/or may include elements of a 5G network. In some embodiments, environment 800 may correspond to a 5G Non-Standalone ("NSA") architecture, in which a 5G RAT may be used in conjunction with one or more other RATs (e.g., a LTE RAT), and/or in which elements of a 5G core network may be implemented by, may be communicatively coupled with, and/or may include elements of another type of core network (e.g., an evolved packet core ("EPC")). In some embodiments, portions of environment 800 may represent or may include a 5G core ("5GC"). As shown, environment 800 may include UE 801, RAN 810 (which may include one or more Next Generation Node Bs ("gNBs") 811), RAN 812 (which may include one or more evolved Node Bs ("eNBs") 813), and various network functions such as AMF 201, MME 816, Serving Gateway ("SGW") 817, Session Management Function ("SMF")/Packet Data Network ("PDN") Gateway ("PGW")-Control plane function ("PGW-C") 820, PCF/Policy Charging and Rules Function ("PCRF") 825, Application Function ("AF") 830, User Plane Function ("UPF")/PGW-User plane function ("PGW-U") 835, Unified Data Management ("UDM")/Home Subscriber Server ("HSS") 840, and Authentication Server Function ("AUSF") 845. Environment 800 may also include one or more networks, such as Data Network ("DN") 850. Environment 800 may include one or more additional devices or systems communicatively coupled to one or more networks (e.g., DN 850).

The example shown in FIG. 8 illustrates one instance of each network component or function (e.g., one instance of SMF/PGW-C 820, PCF/PCRF 825, UPF/PGW-U 835, UDM/HSS 840, and/or AUSF 845). In practice, environment 800 may include multiple instances of such components or functions. For example, in some embodiments, environment 800 may include multiple "slices" of a core network, where each slice includes a discrete and/or logical set of network functions (e.g., one slice may include a first instance of SMF/PGW-C 820, PCF/PCRF 825, UPF/PGW-U 835, UDM/HSS 840, and/or AUSF 845, while another slice may include a second instance of SMF/PGW-C 820, PCF/PCRF 825, UPF/PGW-U 835, UDM/HSS 840, and/or AUSF 845). The different slices may provide differentiated levels of service, such as service in accordance with different Quality of Service ("QoS") parameters.

The quantity of devices and/or networks, illustrated in FIG. 8, is provided for explanatory purposes only. In practice, environment 800 may include additional devices and/or networks, fewer devices and/or networks, different devices and/or networks, or differently arranged devices and/or networks than illustrated in FIG. 8. For example, while not shown, environment 800 may include devices that facilitate or enable communication between various components shown in environment 800, such as routers, modems, gateways, switches, hubs, etc. Alternatively, or additionally, one or more of the devices of environment 800 may perform one or more network functions described as being performed by another one or more of the devices of environment 800. Devices of environment 800 may interconnect with each other and/or other devices via wired connections, wireless connections, or a combination of wired and wireless connections. In some implementations, one or more devices of environment 800 may be physically integrated in, and/or may be physically attached to, one or more other devices of environment 800, such as NEF 303. For example, some or all elements of the EPC, 5GC, etc. may be communicatively coupled to NEF 303 (e.g., via a Nnef interface or other suitable interface).

UE 801 may include a computation and communication device, such as a wireless mobile communication device that is capable of communicating with RAN 810, RAN 812, and/or DN 850. UE 801 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a Machine-to-Machine ("M2M") device, or the like), or another type of mobile computation and communication device. UE 801 may send traffic to and/or receive traffic (e.g., user plane traffic) from DN 850 via RAN 810, RAN 812, and/or UPF/PGW-U 835.

RAN 810 may be, or may include, a 5G RAN that includes one or more base stations (e.g., one or more gNBs 811), via which UE 801 may communicate with one or more other elements of environment 800. UE 801 may communicate with RAN 810 via an air interface (e.g., as provided by gNB 811). For instance, RAN 810 may receive traffic (e.g., voice call traffic, data traffic, messaging traffic, signaling traffic, etc.) from UE 801 via the air interface, and may communicate the traffic to UPF/PGW-U 835, and/or one or more other devices or networks. Similarly, RAN 810 may receive traffic intended for UE 801 (e.g., from UPF/PGW-U 835, AMF 201, and/or one or more other devices or networks) and may communicate the traffic to UE 801 via the air interface. In some embodiments, base station 101 may be, may include, and/or may be implemented by one or more gNBs 811.

RAN 812 may be, or may include, a LTE RAN that includes one or more base stations (e.g., one or more eNBs 813), via which UE 801 may communicate with one or more other elements of environment 800. UE 801 may communicate with RAN 812 via an air interface (e.g., as provided by eNB 813). For instance, RAN 812 may receive traffic (e.g., voice call traffic, data traffic, messaging traffic, signaling traffic, etc.) from UE 801 via the air interface, and may communicate the traffic to UPF/PGW-U 835, and/or one or more other devices or networks. Similarly, RAN 812 may receive traffic intended for UE 801 (e.g., from UPF/PGW-U 835, SGW 817, and/or one or more other devices or networks) and may communicate the traffic to UE 801 via the air interface. In some embodiments, base station 101 may be, may include, and/or may be implemented by one or more eNBs 813.

AMF 201 may include one or more devices, systems, Virtualized Network Functions ("VNFs"), Cloud-Native Network Functions ("CNFs"), etc., that perform operations to register UE 801 with the 5G network, to establish bearer channels associated with a session with UE 801, to hand off UE 801 from the 5G network to another network, to hand off UE 801 from the other network to the 5G network, manage mobility of UE 801 between RANs 810 and/or gNBs 811, and/or to perform other operations. In some embodiments, the 5G network may include multiple AMFs 201, which communicate with each other via the N14 interface (denoted in FIG. 8 by the line marked "N14" originating and terminating at AMF 201).

MME 816 may include one or more devices, systems, VNFs, CNFs, etc., that perform operations to register UE 801 with the EPC, to establish bearer channels associated with a session with UE 801, to hand off UE 801 from the EPC to another network, to hand off UE 801 from another network to the EPC, manage mobility of UE 801 between RANs 812 and/or eNBs 813, and/or to perform other operations.

SGW 817 may include one or more devices, systems, VNFs, CNFs, etc., that aggregate traffic received from one or more eNBs 813 and send the aggregated traffic to an external network or device via UPF/PGW-U 835. Additionally, SGW 817 may aggregate traffic received from one or more UPF/PGW-Us 835 and may send the aggregated traffic to one or more eNBs 813. SGW 817 may operate as an anchor for the user plane during inter-eNB handovers and as an anchor for mobility between different telecommunication networks or RANs (e.g., RANs 810 and 812).

SMF/PGW-C 820 may include one or more devices, systems, VNFs, CNFs, etc., that gather, process, store, and/or provide information in a manner described herein. SMF/PGW-C 820 may, for example, facilitate the establishment of communication sessions on behalf of UE 801. In some embodiments, the establishment of communications sessions may be performed in accordance with one or more policies provided by PCF/PCRF 825.

PCF/PCRF 825 may include one or more devices, systems, VNFs, CNFs, etc., that aggregate information to and from the 5G network and/or other sources. PCF/PCRF 825 may receive information regarding policies and/or subscriptions from one or more sources, such as subscriber databases and/or from one or more users (such as, for example, an administrator associated with PCF/PCRF 825). In some embodiments, PCF 601 may be, may include, and/or may be implemented by PCF/PCRF 825.

AF 830 may include one or more devices, systems, VNFs, CNFs, etc., that receive, store, and/or provide information that may be used in determining parameters (e.g., quality of service parameters, charging parameters, or the like) for certain applications.

UPF/PGW-U 835 may include one or more devices, systems, VNFs, CNFs, etc., that receive, store, and/or provide data (e.g., user plane data). For example, UPF/PGW-U 835 may receive user plane data (e.g., voice call traffic, data traffic, etc.), destined for UE 801, from DN 850, and may forward the user plane data toward UE 801 (e.g., via RAN 810, SMF/PGW-C 820, and/or one or more other devices). In some embodiments, multiple UPFs 835 may be deployed (e.g., in different geographical locations), and the delivery of content to UE 801 may be coordinated via the N9 interface (e.g., as denoted in FIG. 8 by the line marked "N9" originating and terminating at UPF/PGW-U 835). Similarly, UPF/PGW-U 835 may receive traffic from UE 801 (e.g., via RAN 810, SMF/PGW-C 820, and/or one or more other devices), and may forward the traffic toward DN 850. In some embodiments, UPF/PGW-U 835 may communicate (e.g., via the N4 interface) with SMF/PGW-C 820, regarding user plane data processed by UPF/PGW-U 835.

UDM/HSS 840 and AUSF 845 may include one or more devices, systems, VNFs, CNFs, etc., that manage, update, and/or store, in one or more memory devices associated with AUSF 845 and/or UDM/HSS 840, profile information associated with a subscriber. AUSF 845 and/or UDM/HSS 840 may perform authentication, authorization, and/or accounting operations associated with the subscriber and/or a communication session with UE 801. In some embodiments, UDM 301 may be, may include, and/or may be implemented by UDM/HSS 840.

DN 850 may include one or more wired and/or wireless networks. For example, DN 850 may include an Internet Protocol ("IP")-based PDN, a wide area network ("WAN") such as the Internet, a private enterprise network, and/or one or more other networks. UE 801 may communicate, through DN 850, with data servers, other UEs 801, and/or to other servers or applications that are coupled to DN 850. DN 850 may be connected to one or more other networks, such as a public switched telephone network ("PSTN"), a public land mobile network ("PLMN"), and/or another network. DN 850 may be connected to one or more devices, such as content providers, applications, web servers, and/or other devices, with which UE 801 may communicate.

Figure 9:
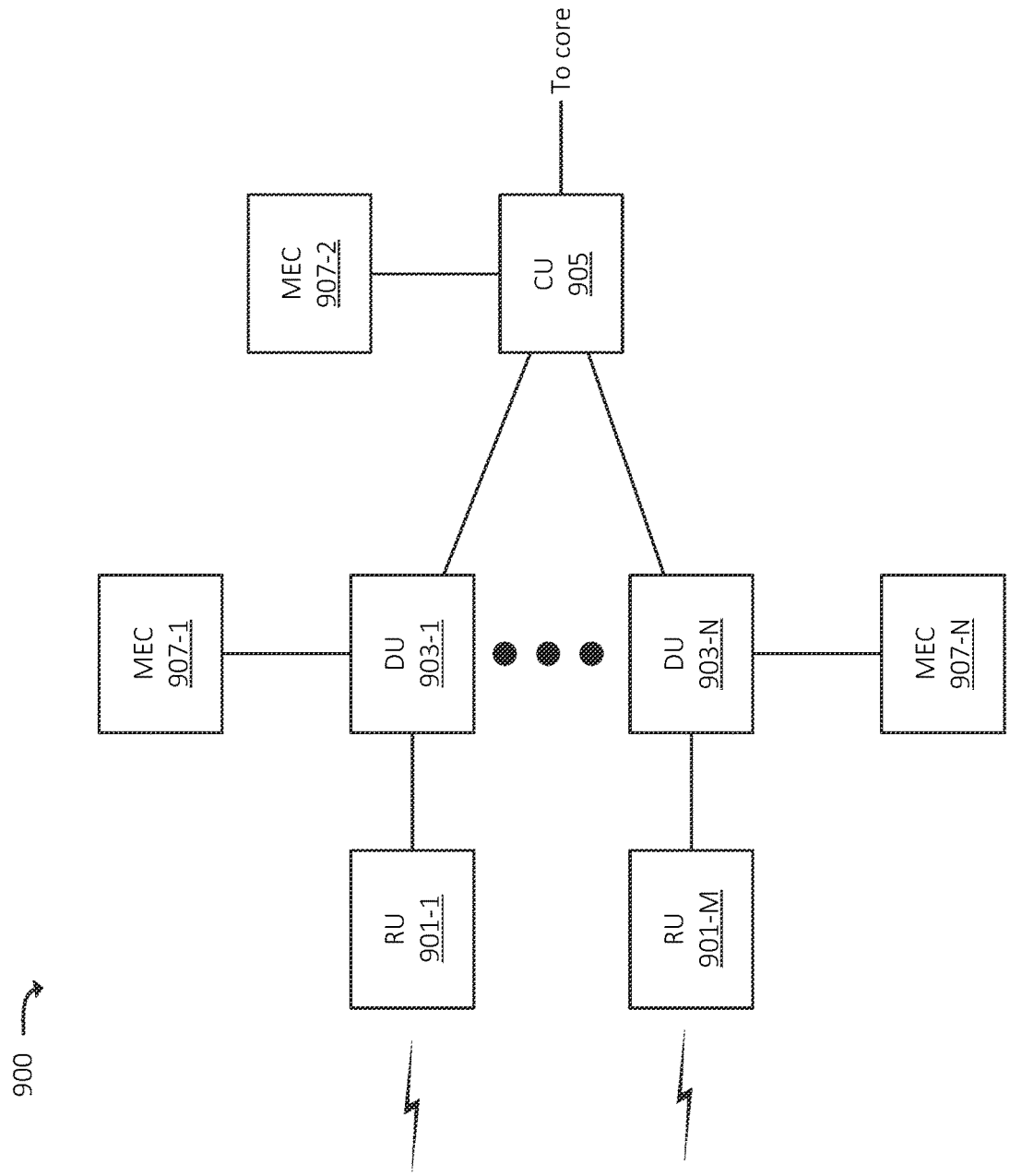
FIG. 9 illustrates an example arrangement of a radio access network ("RAN"), in accordance with some embodiments.

FIG. 9 illustrates an example RAN environment 900, which may be included in and/or implemented by one or more RANs (e.g., RAN 810, RAN 812, or some other RAN). In some embodiments, a particular RAN may include one RAN environment 900. In some embodiments, a particular RAN may include multiple RAN environments 900. In some embodiments, RAN environment 900 may correspond to a particular gNB 811 of a 5G RAN (e.g., RAN 810). In some embodiments, RAN environment 900 may correspond to multiple gNBs 811. In some embodiments, RAN environment 900 may correspond to one or more other types of base stations of one or more other types of RANs. As shown, RAN environment 900 may include Central Unit ("CU") 905, one or more Distributed Units ("DUs") 903-1 through 903-N (referred to individually as "DU 903," or collectively as "DUs 903"), and one or more Radio Units ("RUs") 901-1 through 901-M (referred to individually as "RU 901," or collectively as "RUs 901").

CU 905 may communicate with a core of a wireless network (e.g., may communicate with one or more of the devices or systems described above with respect to FIG. 8, such as AMF 201 and/or UPF/PGW-U 835). In the uplink direction (e.g., for traffic from UEs 801 to a core network), CU 905 may aggregate traffic from DUs 903, and forward the aggregated traffic to the core network. In some embodiments, CU 905 may receive traffic according to a given protocol (e.g., Radio Link Control ("RLC")) from DUs 903, and may perform higher-layer processing (e.g., may aggregate/process RLC packets and generate Packet Data Convergence Protocol ("PDCP") packets based on the RLC packets) on the traffic received from DUs 903.

In accordance with some embodiments, CU 905 may receive downlink traffic (e.g., traffic from the core network) for a particular UE 801, and may determine which DU(s) 903 should receive the downlink traffic. DU 903 may include one or more devices that transmit traffic between a core network (e.g., via CU 905) and UE 801 (e.g., via a respective RU 901). DU 903 may, for example, receive traffic from RU 901 at a first layer (e.g., physical ("PHY") layer traffic, or lower PHY layer traffic), and may process/aggregate the traffic to a second layer (e.g., upper PHY and/or RLC). DU 903 may receive traffic from CU 905 at the second layer, may process the traffic to the first layer, and provide the processed traffic to a respective RU 901 for transmission to UE 801.

RU 901 may include hardware circuitry (e.g., one or more RF transceivers, antennas, radios, and/or other suitable hardware) to communicate wirelessly (e.g., via an RF interface) with one or more UEs 801, one or more other DUs 903 (e.g., via RUs 901 associated with DUs 903), and/or any other suitable type of device. In the uplink direction, RU 901 may receive traffic from UE 801 and/or another DU 903 via the RF interface and may provide the traffic to DU 903. In the downlink direction, RU 901 may receive traffic from DU 903, and may provide the traffic to UE 801 and/or another DU 903.

One or more elements of RAN environment 900 may, in some embodiments, be communicatively coupled to one or more Multi-Access/Mobile Edge Computing ("MEC") devices, referred to sometimes herein simply as "MECs" 907. For example, DU 903-1 may be communicatively coupled to MEC 907-1, DU 903-N may be communicatively coupled to MEC 907-N, CU 905 may be communicatively coupled to MEC 907-2, and so on. MECs 907 may include hardware resources (e.g., configurable or provisionable hardware resources) that may be configured to provide services and/or otherwise process traffic to and/or from UE 801, via a respective RU 901.

For example, DU 903-1 may route some traffic, from UE 801, to MEC 907-1 instead of to a core network via CU 905. MEC 907-1 may process the traffic, perform one or more computations based on the received traffic, and may provide traffic to UE 801 via RU 901-1. In some embodiments, MEC 907 may include, and/or may implement, some or all of the functionality described above with respect to AF 830, UPF 835, and/or one or more other devices, systems, VNFs, CNFs, etc. In this manner, ultra-low latency services may be provided to UE 801, as traffic does not need to traverse DU 903, CU 905, links between DU 903 and CU 905, and an intervening backhaul network between RAN environment 900 and the core network.

Figure 10:
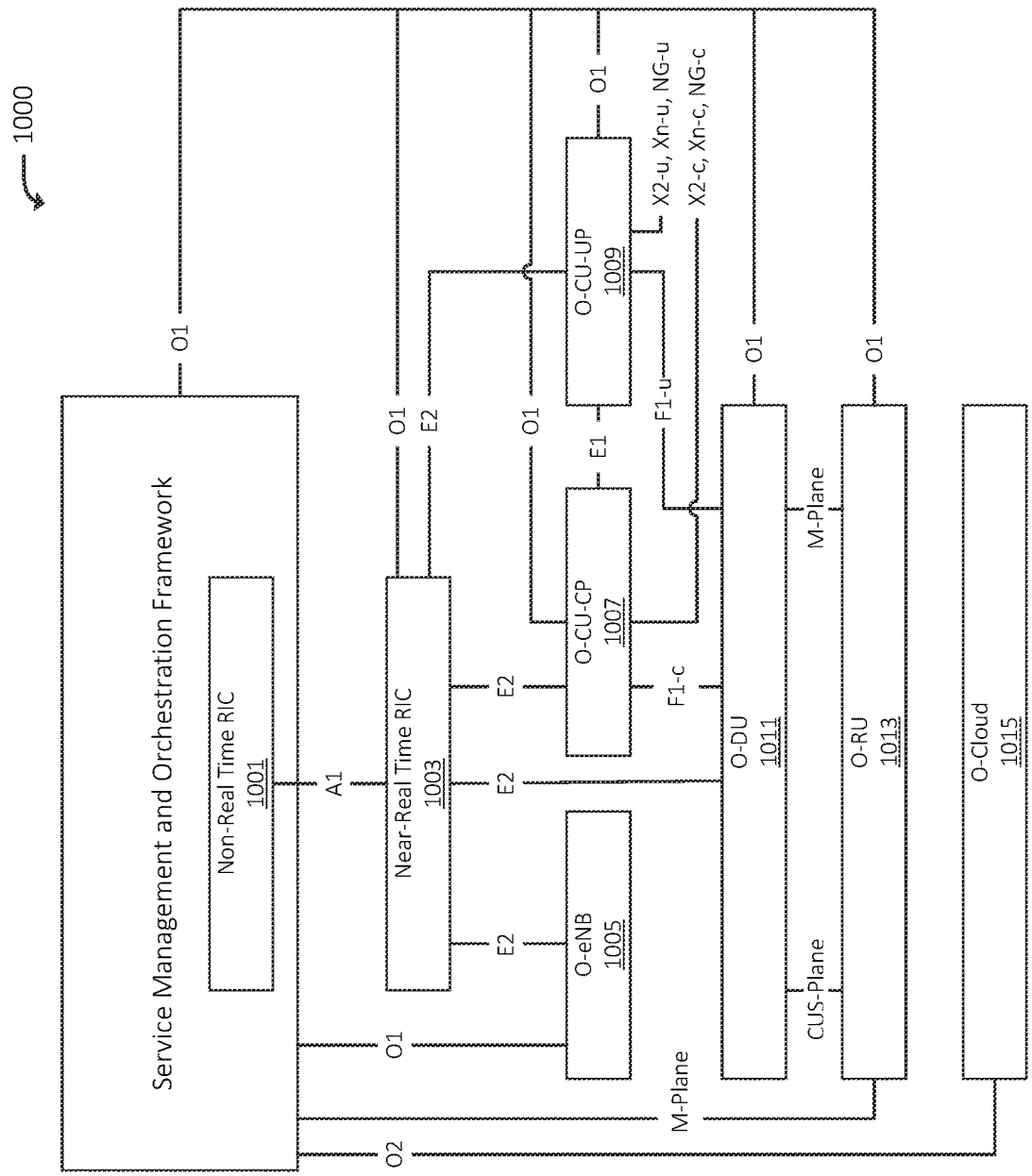
FIG. 10 illustrates an example arrangement of an Open RAN ("O-RAN") environment in which one or more embodiments, described herein, may be implemented.

FIG. 10 illustrates an example O-RAN environment 1000, which may correspond to RAN 810, RAN 812, and/or RAN environment 900. For example, RAN 810, RAN 812, and/or RAN environment 900 may include one or more instances of O-RAN environment 1000, and/or one or more instances of O-RAN environment 1000 may implement RAN 810, RAN 812, RAN environment 900, and/or some portion thereof. As shown, O-RAN environment 1000 may include Non-Real Time Radio Intelligent Controller ("RIC") 1001, Near-Real Time RIC 1003, O-eNB 1005, O-CU-Control Plane ("O-CU-CP") 1007, O-CU-User Plane ("O-CU-UP") 1009, O-DU 1011, O-RU 1013, and O-Cloud 1015. In some embodiments, O-RAN environment 1000 may include additional, fewer, different, and/or differently arranged components.

In some embodiments, some or all of the elements of O-RAN environment 1000 may be implemented by one or more configurable or provisionable resources, such as virtual machines, cloud computing systems, physical servers, and/or other types of configurable or provisionable resources. In some embodiments, some or all of O-RAN environment 1000 may be implemented by, and/or communicatively coupled to, one or more MECs 907.

Non-Real Time RIC 1001 and Near-Real Time RIC 1003 may receive performance information (and/or other types of information) from one or more sources, and may configure other elements of O-RAN environment 1000 based on such performance or other information. For example, Near-Real Time RIC 1003 may receive performance information, via one or more E2 interfaces, from O-eNB 1005, O-CU-CP 1007, and/or O-CU-UP 1009, and may modify parameters associated with O-eNB 1005, O-CU-CP 1007, and/or O-CU-UP 1009 based on such performance information. Similarly, Non-Real Time RIC 1001 may receive performance information associated with O-eNB 1005, O-CU-CP 1007, O-CU-UP 1009, and/or one or more other elements of O-RAN environment 1000 and may utilize machine learning and/or other higher level computing or processing to determine modifications to the configuration of O-eNB 1005, O-CU-CP 1007, O-CU-UP 1009, and/or other elements of O-RAN environment 1000. In some embodiments, Non-Real Time RIC 1001 may generate machine learning models based on performance information associated with O-RAN environment 1000 or other sources, and may provide such models to Near-Real Time RIC 1003 for implementation.

In some embodiments, Non-Real Time RIC 1001 and/or Near-Real Time RIC 1003 may include, may implement, may be implemented by, and/or may otherwise be associated with RAN management system 203. In such embodiments, Non-Real Time MC 1001 and/or Near-Real Time MC 1003 may receive band information (e.g., from AMF 201 and/or some other suitable source), and may configure parameters of one or more other elements of O-RAN environment 1000 based on the received band information. For example, as discussed above, Non-Real Time RIC 1001 and/or Near-Real Time RIC 1003 may instruct O-RU 1013 to modify physical parameters of one or more antennas or radios (e.g., azimuth angle, beam width, beam transmit power, etc.) based on band information. Additionally, or alternatively, Non-Real Time RIC 1001 and/or Near-Real Time RIC 1003 may instruct O-DU 1011 and/or 10-CU-UP 1009 to prioritize, queue, etc. traffic associated with a given UE 105 in accordance with particular QoS parameters selected based on band information provided by or otherwise associated with UE 105.

O-eNB 1005 may perform functions similar to those described above with respect to eNB 813. For example, O-eNB 1005 may facilitate wireless communications between UE 1uu and a core network. O-CU-CP 1007 may perform control plane signaling to coordinate the aggregation and/or distribution of traffic via one or more DUs 903, which may include and/or be implemented by one or more O-DUs 1011, and O-CU-UP 1009 may perform the aggregation and/or distribution of traffic via such DUs 903 (e.g., O-DUs 1011). O-DU 1011 may be communicatively coupled to one or more RUs 901, which may include and/or may be implemented by one or more O-RUs 1013. In some embodiments, O-Cloud 1015 may include or be implemented by one or more MECs 907, which may provide services, and may be communicatively coupled, to O-CU-CP 1007, O-CU-UP 1009, O-DU 1011, and/or O-RU 1013 (e.g., via an O1 and/or O2 interface).

Figure 11:
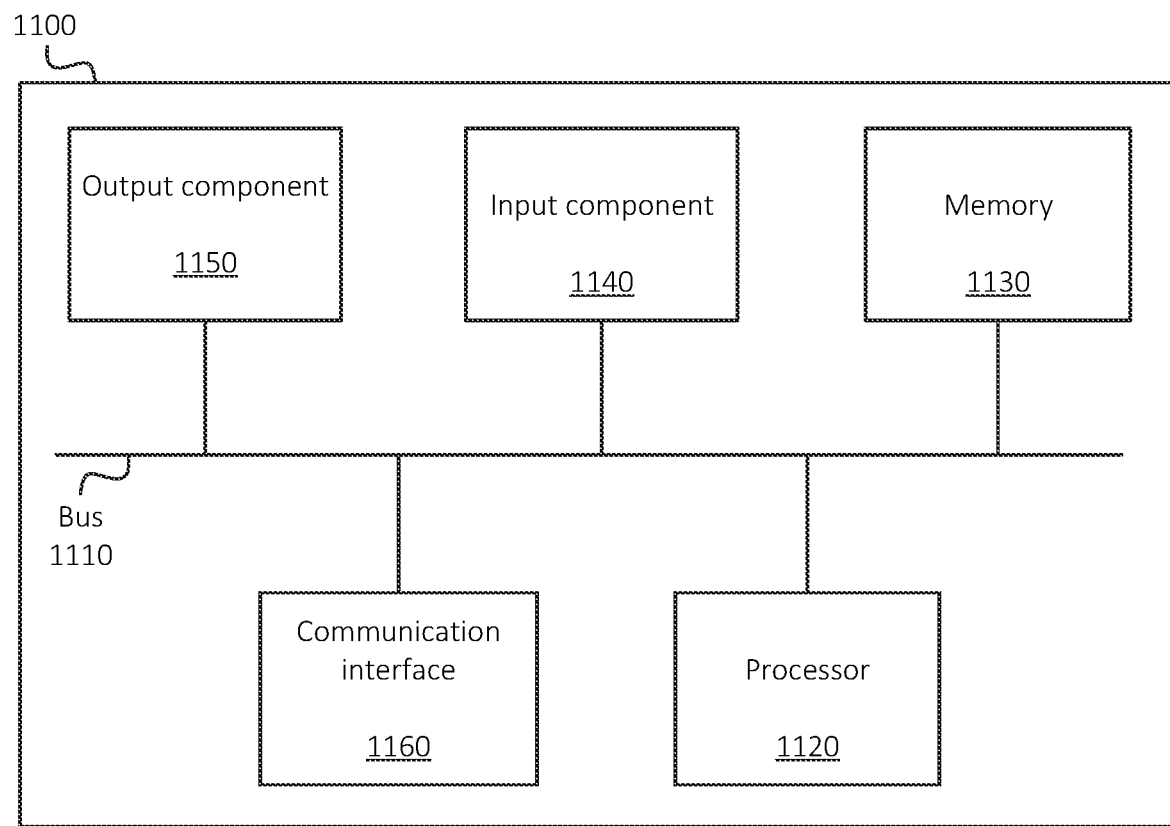
FIG. 11 illustrates example components of one or more devices, in accordance with one or more embodiments described herein.

FIG. 11 illustrates example components of device 1100. One or more of the devices described above may include one or more devices 1100. Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, or processing logic that may interpret and execute instructions. In some embodiments, processor 1120 may be or may include one or more hardware processors. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100 and/or other receives or detects input from a source external to 1140, such as a touchpad, a touchscreen, a keyboard, a keypad, a button, a switch, a microphone or other audio input component, etc. In some embodiments, input component 1140 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1150 may include a mechanism that outputs information to the operator, such as a display, a speaker, one or more light emitting diodes ("LEDs"), etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations relating to one or more processes described above. Device 1100 may perform these operations in response to processor 1120 executing software instructions stored in a computer-readable medium, such as memory 1130. A computer-readable medium may be defined as a non-transitory memory device. A memory device may include space within a single physical memory device or spread across multiple physical memory devices. The software instructions may be read into memory 1130 from another computer-readable medium or from another device. The software instructions stored in memory 1130 may cause processor 1120 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-6), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A system, comprising:
   one or more devices of a core of a wireless network; and
   a User Equipment ("UE") configured to:
      connect or request connection to a base station of the wireless network, wherein the base station implements a plurality of frequency bands, wherein connecting or requesting connection to the base station includes connecting or requesting connection via a particular frequency band of the plurality of frequency bands; and
      provide an indication of the particular frequency band to the one or more devices of a core of the wireless network,
   wherein the one or more devices of the core of the wireless network are configured to:
      maintain information associating a plurality of different sets of UE Route Selection Policy ("URSP") rules with a plurality of different frequency bands, and
      select a particular set of URSP rules, out of the plurality of sets of URSP rules, based on identifying that the particular frequency band indicated by the UE is associated with the particular set of URSP rules,
   wherein the UE is further configured to:
      receive, from the one or more devices of the core of the wireless network and in response to the provided indication of the particular frequency band, the particular set of URSP rules; and
      establish one or more communication sessions with the core of the wireless network using the received particular set of URSP rules.

2. The system of claim 1, wherein the one or more devices of the core of the wireless network include at least one of:
   an Access and Mobility Management Function ("AMF"), or
   a Mobility Management Entity ("MME").

3. The system of claim 1, wherein providing the indication of the particular frequency band includes providing the indication via control plane messaging from the UE to the one or more devices of the core of the wireless network.

4. The system of claim 1, wherein providing the indication of the particular frequency band includes providing the indication via Non-Access Stratum ("NAS") messaging from the UE to the one or more devices of the core of the wireless network.

5. The system of claim 1, wherein providing the indication of the particular frequency band includes providing the indication via an N1 interface.

6. The system of claim 1, wherein the particular set of URSP rules includes information associating a particular set of traffic descriptors with a particular network slice.

7. The system of claim 6, wherein the UE is further configured to:
  identify that a particular communication session, of the one or more communication sessions, is associated with the particular set of traffic descriptors; and
  identify, based on the particular set of URSP rules and further based on identifying that the particular communication session is associated with the particular set of traffic descriptors, that the particular communication session is further associated with the particular network slice, wherein establishing the particular communication session includes requesting the particular network slice for the particular communication session.

8. One or more non-transitory computer-readable media, storing a plurality of processor-executable instructions to:
  connect or request connection between a User Equipment ("UE") and a base station of a wireless network, wherein the base station implements a plurality of frequency bands, wherein connecting or requesting connection to the base station includes connecting or requesting connection via a particular frequency band of the plurality of frequency bands;
  provide an indication of the particular frequency band to one or more devices of a core of the wireless network;
  maintain, by the one or more devices of the core of the wireless network, information associating a plurality of different sets of UE Route Selection Policy ("URSP") rules with a plurality of different frequency bands;
  select, by the one or more devices of the core of the wireless network, a particular set of URSP rules, out of the plurality of sets of URSP rules, based on identifying that the particular frequency band indicated by the UE is associated with the particular set of URSP rules;
  receive, from the one or more devices of the core of the wireless network and in response to the provided indication of the particular frequency band, the particular set of URSP rules; and
  establish one or more communication sessions with the core of the wireless network using the particular set of URSP rules.

9. The one or more non-transitory computer-readable media of claim 8, wherein the one or more devices of the core of the wireless network include at least one of:
  an Access and Mobility Management Function ("AMF"), or
  a Mobility Management Entity ("MME").

10. The one or more non-transitory computer-readable media of claim 8, wherein providing the indication of the particular frequency band includes providing the indication via control plane messaging from the UE to the one or more devices of the core of the wireless network.

11. The one or more non-transitory computer-readable media of claim 8, wherein providing the indication of the particular frequency band includes providing the indication via Non-Access Stratum ("NAS") messaging from the UE to the one or more devices of the core of the wireless network.

12. The one or more non-transitory computer-readable media of claim 8, wherein providing the indication of the particular frequency band includes providing the indication via an N1 interface.

13. The one or more non-transitory computer-readable media of claim 8, wherein the particular set of URSP rules includes information associating a particular set of traffic descriptors with a particular network slice.

14. The one or more non-transitory computer-readable media of claim 13, wherein the plurality of processor-executable instructions further include processor-executable instructions to:
  identify that a particular communication session, of the one or more communication sessions, is associated with the particular set of traffic descriptors; and
  identify, based on the particular set of URSP rules and further based on identifying that the particular communication session is associated with the particular set of traffic descriptors, that the particular communication session is further associated with the particular network slice,
  wherein establishing the particular communication session includes requesting the particular network slice for the particular communication session.

15. A method, comprising:
  connecting or requesting connection, by a User Equipment ("UE"), to a base station of a wireless network, wherein the base station implements a plurality of frequency bands, wherein connecting or requesting connection to the base station includes connecting or requesting connection via a particular frequency band of the plurality of frequency bands;
  providing an indication of the particular frequency band to one or more devices of a core of the wireless network;
  maintaining, by the one or more devices of the core of the wireless network, information associating a plurality of different sets of UE Route Selection Policy ("URSP") rules with a plurality of different frequency bands;
  selecting, by the one or more devices of the core of the wireless network, a particular set of URSP rules, out of the plurality of sets of URSP rules, based on identifying that the particular frequency band indicated by the UE is associated with the particular set of URSP rules;
  receiving, by the UE, from one or more devices of the core of the wireless network and in response to the provided indication of the particular frequency band, the particular set of URSP rules; and
  establishing one or more communication sessions with the core of the wireless network using the particular set of URSP rules.

16. The method of claim 15, wherein the one or more devices of the core of the wireless network include at least one of:
  an Access and Mobility Management Function ("AMF"), or
  a Mobility Management Entity ("MME").

17. The method of claim 15, wherein providing the indication of the particular frequency band includes providing the indication via control plane messaging from the UE to the one or more devices of the core of the wireless network.

18. The method of claim 15, wherein providing the indication of the particular frequency band includes providing the indication via Non-Access Stratum ("NAS") messaging from the UE to the one or more devices of the core of the wireless network.

19. The method of claim 15, wherein providing the indication of the particular frequency band includes providing the indication via an N1 interface.

20. The method of claim 15, wherein the particular set of URSP rules includes information associating a particular set of traffic descriptors with a particular network slice, wherein the method further comprises:

identifying that a particular communication session, of the one or more communication sessions, is associated with the particular set of traffic descriptors; and identifying, based on the particular set of URSP rules and further based on identifying that the particular communication session is associated with the particular set of traffic descriptors, that the particular communication session is further associated with the particular network slice, wherein establishing the particular communication session includes requesting the particular network slice for the particular communication session.

\* \* \* \* \*